United States Patent
Cho

(10) Patent No.: US 9,835,929 B2
(45) Date of Patent: Dec. 5, 2017

(54) MULTI-LAYER COATING SYSTEM USING VOIDS FOR HEAT BLOCKING SYSTEM AND METHOD FOR MANUFACTURING SAME

(71) Applicant: MATERIALS VISION CO., LTD., Incheon (KR)

(72) Inventor: Sung Nae Cho, Seoul (KR)

(73) Assignee: MATERIALS VISION CO., LTD., Incheon (KR)

( * ) Notice: Subject to any disclaimer, the term of this patent is extended or adjusted under 35 U.S.C. 154(b) by 23 days.

(21) Appl. No.: 15/033,842

(22) PCT Filed: Nov. 3, 2014

(86) PCT No.: PCT/KR2014/010438
§ 371 (c)(1),
(2) Date: May 2, 2016

(87) PCT Pub. No.: WO2015/065134
PCT Pub. Date: May 7, 2015

(65) Prior Publication Data
US 2016/0299404 A1    Oct. 13, 2016

Related U.S. Application Data

(63) Continuation of application No. 14/146,426, filed on Jan. 2, 2014, now Pat. No. 9,372,291.

(30) Foreign Application Priority Data

Apr. 30, 2014    (KR) .................. 10-2014-0052953

(51) Int. Cl.
*G02F 1/23* (2006.01)
*B05D 7/00* (2006.01)
(Continued)

(52) U.S. Cl.
CPC ............... *G02F 1/23* (2013.01); *B05D 7/222* (2013.01); *B05D 7/50* (2013.01); *B05D 7/544* (2013.01);
(Continued)

(58) Field of Classification Search
CPC . B05D 7/04; B05D 7/222; B05D 7/50; B05D 7/544; B05D 7/546; G02F 1/0018;
(Continued)

(56) References Cited

U.S. PATENT DOCUMENTS 3,532,038 A *  10/1970  Rottmann  ........  B29D 11/00278
                                               355/46
6,235,105 B1    5/2001  Hubbard, et al.
(Continued)

FOREIGN PATENT DOCUMENTS

CN    102073077 A     5/2011
DE    20311944 U1     1/2004
(Continued)

OTHER PUBLICATIONS

International Search Report issued in PCT/KR2014/010438, dated Mar. 11, 2015.

*Primary Examiner* — Loha Ben
(74) *Attorney, Agent, or Firm* — KORUS Patent, LLC; Seong Il Jeong

(57) ABSTRACT

Provided are a multilayered-coating system and a method of manufacturing the same. The multi-layered coating system includes: a layer 1 including a plurality of spherical voids with a radius $a_1$ that are randomly distributed and separated from one another and a filler material with a refractive index $n_1$ that is disposed in a space between the spherical voids; and subsequent layers expressed as the following word-equation, "a layer i located above a layer i−1 and including a plurality of spherical voids with a radius $a_i$ that are
(Continued)

randomly distributed and separated from one another, and a filler material with a refractive index $n_f$, the filler material disposed in a space between the spherical voids where i is an integer greater than 1".

31 Claims, 9 Drawing Sheets

Related U.S. Application Data

(60) Provisional application No. 61/899,832, filed on Nov. 4, 2013, provisional application No. 61/908,608, filed on Nov. 25, 2013.

(51) Int. Cl.

| | | |
|---|---|---|
| *E04B 1/76* | (2006.01) | |
| *G02B 5/20* | (2006.01) | |
| *G02B 5/26* | (2006.01) | |
| *G02F 1/01* | (2006.01) | |
| *F28F 13/00* | (2006.01) | |
| *B05D 7/22* | (2006.01) | |
| *B29C 65/48* | (2006.01) | |
| *B29C 65/62* | (2006.01) | |
| *C03C 17/00* | (2006.01) | |
| *F16L 59/02* | (2006.01) | |
| *F16L 59/14* | (2006.01) | |
| *G02F 1/00* | (2006.01) | |
| *G02B 5/02* | (2006.01) | |
| *B05D 7/04* | (2006.01) | |
| *B32B 33/00* | (2006.01) | |
| *B32B 37/14* | (2006.01) | |

(52) U.S. Cl.
CPC .............. *B05D 7/546* (2013.01); *B29C 65/48* (2013.01); *B29C 65/62* (2013.01); *C03C 17/001* (2013.01); *E04B 1/76* (2013.01); *E04B 1/7604* (2013.01); *F16L 59/029* (2013.01); *F16L 59/14* (2013.01); *F28F 13/003* (2013.01); *G02B 5/0242* (2013.01); *G02B 5/0247* (2013.01); *G02B 5/206* (2013.01); *G02B 5/208* (2013.01); *G02B 5/26* (2013.01); *G02F 1/0018* (2013.01); *G02F 1/0063* (2013.01); *G02F 1/0102* (2013.01); *B05D 7/04* (2013.01); *B32B 33/00* (2013.01); *B32B 37/14* (2013.01); *F28F 2265/10* (2013.01); *F28F 2270/00* (2013.01); *G02F 2201/083* (2013.01); *G02F 2201/30* (2013.01); *Y10T 428/24967* (2015.01); *Y10T 428/249921* (2015.04); *Y10T 428/249971* (2015.04); *Y10T 428/249975* (2015.04); *Y10T 428/25* (2015.01)

(58) Field of Classification Search
CPC ........ G02F 1/0063; G02F 1/0102; G02F 1/23; G02B 5/0242; G02B 5/0247; G02B 5/206; G02B 5/208; G02B 5/26; F16L 59/029; F16L 59/14; F28F 13/003; B29C 65/48; B29C 65/62; B32B 33/00; B32B 37/14; B32B 3/26; B32B 5/16; B32B 27/02; Y10T 428/249921; Y10T 428/249971; E04B 1/7604
USPC ........ 359/263, 278, 359; 428/215, 221, 323, 428/421, 422; 362/157, 311.05, 603, 616, 362/627; 427/66, 69, 71, 97.1, 97.7, 98.2
See application file for complete search history.

(56) References Cited

U.S. PATENT DOCUMENTS

| | | | |
|---|---|---|---|
| 6,335,094 B1 | 1/2002 | Owaki et al. | |
| 7,045,052 B2* | 5/2006 | Kochergin | B82Y 20/00 |
| | | | 205/656 |
| 7,628,906 B2* | 12/2009 | Kochergin | B82Y 20/00 |
| | | | 205/656 |
| 7,760,424 B2 | 7/2010 | Takeuchi, et al. | |
| 7,955,531 B1* | 6/2011 | Khanarian | G02B 6/0036 |
| | | | 156/60 |
| 8,514,398 B2* | 8/2013 | Pang | G01N 21/554 |
| | | | 250/286 |
| 8,790,778 B2* | 7/2014 | Shiao | E04D 5/12 |
| | | | 428/144 |
| 8,894,934 B2* | 11/2014 | Pang | G01N 21/554 |
| | | | 356/244 |
| 9,028,123 B2* | 5/2015 | Nichol | G02B 6/0076 |
| | | | 349/63 |
| 9,210,763 B2* | 12/2015 | Chen | H01L 33/58 |
| 9,222,641 B2* | 12/2015 | Domercq | H01L 51/5215 |
| 9,417,361 B2* | 8/2016 | Amano | G02B 1/118 |
| 2009/0202819 A1 | 8/2009 | Asahi et al. | |
| 2013/0108873 A1 | 5/2013 | Shiao et al. | |
| 2013/0161578 A1 | 6/2013 | Shiao et al. | |

FOREIGN PATENT DOCUMENTS

| | | |
|---|---|---|
| EP | 0877103 A2 | 11/1998 |
| JP | 11-181629 A | 7/1999 |
| JP | 2000-239577 A | 9/2000 |
| JP | 2009-108222 A | 5/2009 |
| JP | 4748573 B2 | 8/2011 |

* cited by examiner

MULTI-LAYER COATING SYSTEM USING VOIDS FOR HEAT BLOCKING SYSTEM AND METHOD FOR MANUFACTURING SAME

TECHNICAL FIELD

The present invention relates to a multi-layered coating system, and more particularly, to a multi-layered coating system using voids for a heat blocking system and a method of manufacturing the same.

BACKGROUND ART

A great portion of man-made energy is used for heating and cooling. For example, a large portion of utility bills in Summer are often associated with energy used for running air-conditioners to keep the indoor temperatures low, whereas, in Winter, energy is used for running heaters to maintain the indoors warm. Most of the energy wasted during heating and cooling may be attributed to poor insulation against heat loss. In most prior arts on heat resistant paints, an ordinary paint is turned into a heat resistant paint by being blended with particulates and voids. In other similar prior arts, colloidal particles are blended in film-forming materials, and such materials are applied over substrates such as windowpanes or glasses to block infrared electromagnetic waves.

One class of prior arts on heat blocking technologies involves heat resistant paints. In U.S. Pat. No. 4,623,390, glass microspheres or hollow glass extenders are blended in an ordinary paint to reduce direct thermal conductivity, which greatly improves insulation against heat loss. In one embodiment, glass microspheres of diameters ranging from approximately 50 microns to 150 microns are blended in an ordinary paint, whereas, in an another embodiment, glass microspheres of approximately 100 microns in diameters are blended in an ordinary paint. However, U.S. Pat. No. 4,623,390 does not discuss any aspects of multi-layered coating structures discussed in the present invention.

In U.S. Pat. No. 8,287,998, hollow microspheres selected from glass, ceramic, and organic polymer microspheres with mean particle sizes between 0.5 micron and 150 microns are blended in an ordinary paint to reduce direct thermal conductivity. Furthermore, in U.S. Pat. No. 8,287,998, infrared reflective pigment materials are also incorporated in an ordinary paint mixture to reduce thermal conductivity associated with radiative heat transfers. However, U.S. Pat. No. 8,287,998 does not discuss any aspects of the multi-layered coating structures discussed in the present invention.

U.S. Pat. No. 2010/0,203,336 discloses a solar reflective roofing granule. In one embodiment, a solar reflective granule is formed by sintering ceramic particles, wherein the sintered ceramic particles are coated with solar reflective particles. However, U.S. Pat. No. 2010/0,203,336 does not discuss any aspects of the multi-layered coating structures covered in the present disclosure.

In U.S. Pat. No. 2013/0,108,873, a roofing granule forming particle is coated with a nanoparticle layer which reflects near infrared radiation. Similarly, in U.S. Pat. No. 2013/0,161,578, a roofing granule is formed from an infrared reflecting inert mineral core particle which has naturally occurring voids (or defects). However, neither U.S. Pat. No. 2013/0,108,873 nor U.S. Pat. No. 2013/0,161,578 discuss any aspects of the multi-layered coating structures presented in the present disclosure.

U.S. Pat. No. 2008/0,035,021 discloses a method for fabricating aluminum phosphate hollow microspheres. Also, it is illustrated how such particulates may be used to improve insulation against heat loss. However, U.S. Pat. No. 2008/0,035,021 does not discuss any aspects of the multi-layered coating structures covered by the present invention.

U.S. Pat. No. 2007/0,298,242 discloses a lens for filtering optical waves, wherein the metallic nano-particulates including thin-film layers are formed on a surface of the lens. However, U.S. Pat. No. 2007/0,298,242 does not discuss any aspects of the multi-layered coating structures discussed in the present disclosure.

In U.S. Pat. No. 2007/0,036,985, indium tin oxide (ITO) particulates are blended with a film-forming mixture to form a thin-film layer which reflects infrared waves. However, U.S. Pat. No. 2007/0,036,985 does not discuss any aspects of the multi-layered coating structures illustrated in the present invention.

U.S. Pat. No. 2013/0,266,800 discloses a method for preparing aluminum-doped zinc oxide (AZO) nanocrystals. It further discloses a thin-film structure for reflecting infrared waves which uses AZO nano-particulates. However, U.S. Pat. No. 2013/0,266,800 A1 does not discuss any aspects of the multi-layered coating structures discussed in the present disclosure.

U.S. Pat. No. 7,760,424 and U.S. Pat. No. 8,009,351 disclose multi-layered thin-film structures using colloidal particles to reflect infrared electromagnetic waves. However, U.S. Pat. No. 7,760,424 and U.S. Pat. No. 8,009,351 disclose that particulates in each layer of a multi-layered structure are regularly arrayed with regular lattice spacing therebetween, whereas the present invention describes that voids are randomly distributed in each layer of a multi-layered coating system. U.S. Pat. No. 7,760,424 and U.S. Pat. No. 8,009,351 rely on the Bragg's law for the description of infrared reflections, whereas the present invention relies on the Mie scattering theory for the description of infrared reflections. In order to make visible wavelengths highly transparent, U.S. Pat. No. 7,760,424 and U.S. Pat. No. 8,009,351 require the following restrictions: a) a refractive index of particulates and a refractive index of a filler material disposed in a space between the particulates must be nearly identical, whereas in the present invention, a filler material and voids that are randomly distributed are not required to have nearly identical refractive indices. Infrared reflections in U.S. Pat. No. 7,760,424 and U.S. Pat. No. 8,009,351 strongly depend on an angle of incident incoming waves, typical characteristics of photonic crystals, and a consequence of the Bragg's law, whereas infrared reflections in the present invention do not strongly depend on an angle of incidence of incoming waves, typical characteristics of photonic crystals, and a consequence of the Bragg's law. Such noticeable differences clearly distinguish the present invention from U.S. Pat. No. 7,760,424 and U.S. Pat. No. 8,009,351.

The following prior arts on quantum dot technologies are listed here for reference: U.S. Pat. No. 8,362,684, U.S. Pat. No. 8,395,042, U.S. Pat. No. 2013/0,003,163, and U.S. Pat. No. 2013/0,207,073. Although these prior arts are technologically unrelated to the present invention, there are similarities in the distribution of voids in each layer of a multi-layered coating system. However, the present disclosure and the listed prior arts on quantum dot technologies are based on fundamentally different laws of physics and two should not be regarded as being the same.

DETAILED DESCRIPTION OF THE INVENTION

Technical Problem

The present invention provides a multi-layered coating system using voids for a heat blocking system and a method of manufacturing the same.

Technical Solution

According to an embodiment of the invention, there is provided a multi-layered coating system including: a layer 1 including a plurality of spherical voids with a radius $a_1$ that are randomly distributed and separated from one another, and a filler material with a refractive index $n_1$ that is disposed in a space between the spherical voids; and subsequent layers expressed as the following word-equation, "a layer i located above a layer i−1 and including a plurality of spherical voids with a radius $a_i$ that are randomly distributed and separated from one another, and a filler material with a refractive index $n_i$ that is disposed in a space between the spherical voids where integer i is greater than 1".

According to another embodiment of the invention, the multi-layered coating system may further include a substrate located under the layer 1.

According to another embodiment of the invention, the multi-layered coating system may further include a substrate above a layer farthest from the layer 1.

According to another embodiment of the invention, the substrate may include one selected from a group consisting of a conductive material, a dielectric material, a semiconductor material, and a textile.

According to another embodiment of the invention, the multi-layered coating system may further include a sealing member configured to seal the multi-layered coating system from the outside.

According to another embodiment of the invention, substantially no air may exist in the sealing member.

According to another embodiment of the invention, the layer i may have a thickness different from a thickness of the layer i−1 where i is an integer greater than 1.

According to another embodiment of the invention, the layer i and the layer i−1 may have same thickness where i is an integer greater than 1.

According to another embodiment of the invention, each layer may have a thickness ranging from about 0.01 micron to about 10,000 microns.

According to another embodiment of the invention, the filler material may include one selected from a group consisting of a polymeric material, a binder, a resin, a dielectric material, and a ceramic material.

According to another embodiment of the invention, the refractive index of the filler material may satisfy $n_i = n_{i-1}$ where i is an integer greater than 1.

According to another embodiment of the invention, the refractive index of the filler material may satisfy $n_i > n_{i-1}$ where i is an integer greater than 1.

According to another embodiment of the invention, the radius of the spherical voids may satisfy $a_i > a_{i-1}$ where i is an integer greater than 1.

According to another embodiment of the invention, the radius of the spherical voids and the refractive index of the filler material may satisfy $a_i = a_{i-1}$ and $n_i > n_{i-1}$ where i is an integer greater than 1.

According to another embodiment of the invention, the multi-layered coating system may further include a plurality of spherical voids with a radius b that are randomly distributed in all of the layers and separated from one another, wherein the radius b satisfies $b > a_1$ and $b > a_i$ where i is an integer greater than 1.

According to another embodiment of the invention, the multi-layered coating system may further include a plurality of spherical particles with a radius $c_1$ that are randomly distributed in the filler material of the layer 1 and separated from one another, and a plurality of spherical particles with a radius $c_i$ that are randomly distributed in the filler material of the layer i and separated from one another, wherein $c_1$ satisfies $b > a_1 > c_1$ and $c_i$ satisfies $b > a_i > c_i$ and $c_i > c_{i-1}$ where i is an integer greater than 1.

According to another embodiment of the invention, the spherical particles may include one selected from a group consisting of a conductive material, a dielectric material, a semiconductor material, and a ceramic material.

According to another embodiment of the invention, the filler material may further include a plurality of holes formed in the filler material.

According to another embodiment of the invention, each of the plurality of holes may have a radius larger than the radius of the spherical voids.

According to another embodiment of the invention, the spherical voids may have a cavity radius ranging from about 0.002 micron to about 500 microns.

According to another embodiment of the invention, the spherical voids may be formed of one selected from a group consisting of hollow dielectric shells, hollow conductive shells, and hollow semiconductor shells.

According to another embodiment of the invention, the multi-layered coating system may further include: a first electrode located adjacent to the farther of two surfaces of the layer that is located farthest from the substrate; and a second electrode located between the layer 1 and the substrate, wherein a first voltage is applied to the first electrode, and a second voltage different from the first voltage is applied to the second electrode.

According to another embodiment of the invention, there is provided a method of manufacturing a multi-layered coating system, the method including: (1) preparing a first solution in which a plurality of spherical voids with a radius $a_1$ are blended with a filler material with a refractive index $n_1$; (2) processing a substrate with the first solution and forming, on the substrate, a layer 1 including a plurality of spherical voids with the radius $a_1$ that are randomly distributed and separated from one another, and a filler material with the refractive index $n_1$ that is disposed in a space between the spherical voids; (3) preparing an ith solution in which a plurality of spherical voids with a radius $a_i$ is blended with a filler material with a refractive index $n_1$ where i is an integer greater than 1; and (4) processing the substrate on which a layer i−1 is formed with the ith solution and forming, on the layer i−1 layer, a layer i including a plurality of spherical voids with the radius $a_1$ that are randomly distributed and separated from one another, and a filler material with the refractive index $n_i$ that is disposed in a space between the spherical voids where i is an integer greater than 1.

According to another embodiment of the invention, the processing of (2) may be one selected from a group consisting of dipping the substrate into the first solution, spin coating the first solution to the substrate, spin casting the first solution to the substrate, and spraying the first solution to the substrate.

According to another embodiment of the invention, the processing of (4) may be one selected from a group consisting of dipping the substrate on which the layer i−1 is formed into the ith solution, spin coating the ith solution to the substrate on which the layer i−1 is formed, spin casting the ith solution to the substrate on which the layer i−1 is formed, and spraying the ith solution to the substrate on which the layer i−1 is formed where i is an integer greater than 1.

Advantageous Effects

The present invention may provide a multi-layered coating system using voids for a heat blocking system and a method of manufacturing the same.

DESCRIPTION OF THE DRAWINGS

For a more complete understanding of the present invention, reference is made to the following description and accompanying drawings in which.

BEST MODE

Figure 1:
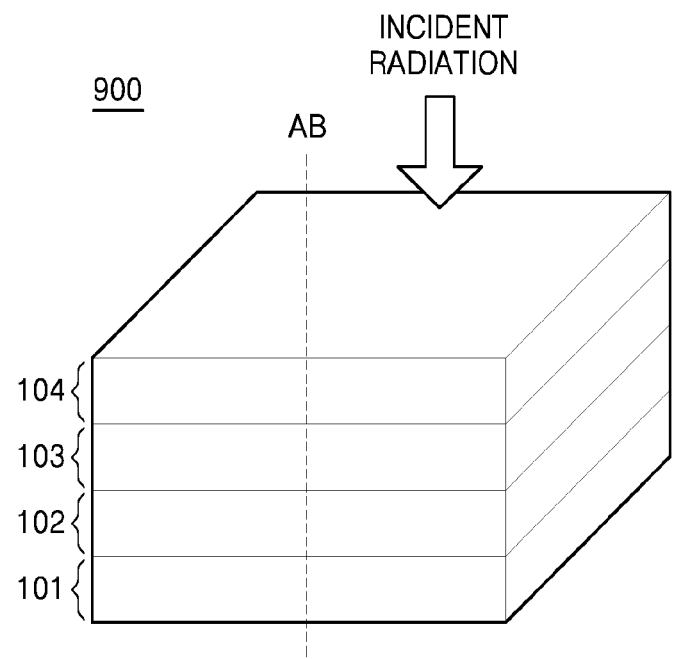
FIG. 1 is a schematic view of a multi-layered coating system according to the preset invention.

Various embodiments will now be described in detail with reference to the accompanying drawings so that this disclosure will be thorough and complete. It should be understood that there is no intent to limit embodiments to the particular forms disclosed here, as these embodiments are merely provided, referring to the figures, to explain various aspects of the present disclosure. The embodiments here are to cover all modifications, equivalents, and alternatives that fall within the scope of the present invention.

In the drawings, thicknesses of layers, and sizes of regions, spherical particulates, and spherical voids may be exaggerated for clarity, and like numerals refer to like elements throughout the description of the drawings. The embodiments here are described with reference to cross-sectional views of idealized embodiments. Thus, particular shapes or regions in the embodiments should not be interpreted as limited to the particular shapes or regions illustrated in the embodiments, but such shapes or regions may include deviations that result from manufacturing tolerances. For example, a spherical particulate in the embodiment may actually be represented by a particulate with a spheroidal shape that slightly deviates from an ideal spherical shape in a real device.

Throughout the description, the terms such as 'first sub-coating layer', 'second sub-coating layer', 'third sub-coating layer', and 'fourth sub-coating layer' are used to refer to particular layers in the embodiments. The terms such as 'layer 1', 'layer 2', 'layer 3', and 'layer 3' may be used instead whenever more appropriate.

In order to more specifically describe the embodiments, various aspects will now be described in detail with reference to the attached drawings. However, the present invention is not limited to these embodiments.

FIG. 1 is a schematic view of a multi-layered coating system 900 according to an embodiment of the present invention. The multi-layered coating system 900 may include a first sub-coating layer 101, a second sub-coating layer 102 located above the first sub-coating layer 101, a third sub-coating layer 103 located above the second sub-coating layer 102, and a fourth sub-coating layer 104 located above the third sub-coating layer 103. Although the multi-layered coating system 900 includes four sub-coating layers, that is, the first sub-coating layer 101, the second sub-coating layer 102, the third sub-coating layer 103, and the fourth sub-coating layer 104 for conciseness, the number of sub-coating layers of a multi-layered coating system of the present invention is not limited thereto. It is assumed that electromagnetic radiation is incident on the fourth sub-coating layer 104 of the multi-layered coating system 900.

Figure 2:
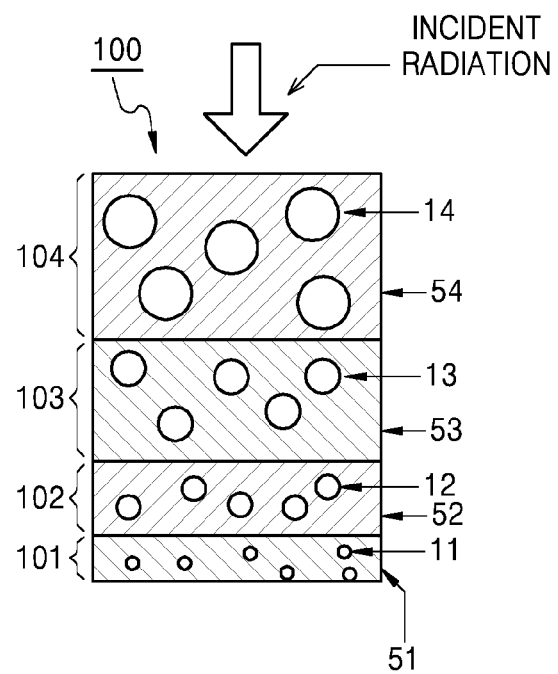
FIG. 2 is a cross-sectional view taken along line AB of the multi-layered coating system of FIG. 1 according to an embodiment of the present invention.

FIG. 2 is a cross-sectional view taken along line AB of the multi-layered coating system 900 according to a first embodiment 100. In the first embodiment 100, the second sub-coating layer 102 has a greater thickness than the first sub-coating layer 101, the third sub-coating layer 103 has a greater thickness than the second sub-coating layer 102, and the fourth sub-coating layer 104 has a greater thickness than the third sub-coating layer 103. However, a thickness of each sub-coating layer in the multi-layered coating system of the present invention including the first embodiment 100 is not limited. For example, sub-coating layers may have sequentially increasing thicknesses, sequentially decreasing thicknesses, or the same thickness. In general, as long as each sub-coating layer has a thickness which is thick enough to include a spherical void, a thickness of each sub-coating layer is not limited. As long as each sub-coating layer has a thickness equal to or greater than a diameter of a spherical void included in each sub-coating layer, a thickness of each sub-coating layer is not limited. For example, each sub-coating layer may have a thickness ranging from 0.01 micron to 10,000 microns.

In the multi-layered coating system of the present invention including the first embodiment 100, each sub-coating layer includes a plurality of spherical voids that are randomly distributed. For example, in the first embodiment 100, the first sub-coating layer 101 includes a plurality of first spherical voids 11 that are randomly distributed, the second sub-coating layer 102 includes a plurality of second spherical voids 12 that are randomly distributed, the third sub-coating layer 103 includes a plurality of third spherical voids 13 that are randomly distributed, and the fourth sub-coating layer 104 includes a plurality of fourth spherical voids 14 that are randomly distributed.

The reason why, in the multi-layered coating system of the present invention including the first embodiment 100, spherical voids of each sub-coating layer have disordered (random) arrangements, instead of having ordered pattern arrangements such as lattice arrangements in crystalline structures and photonic crystals is simple. When spherical voids are arranged in an ordered pattern (that is, when voids are arrayed at definite lattice spacing), electromagnetic reflections occur profoundly at a discrete set of wavelength values which are determined by a lattice constant in accordance with the Bragg's law. Although such characteristic is ideal for tuning applications, where only discrete wavelength values are selected for tuning, it is not suitable for the kind of applications targeted by the present invention. For instance, an infrared portion of an electromagnetic spectrum, which portion accounts for most of heat energy, extends from 0.7 micron to roughly 1,000 microns in wavelengths. For successful heat blocking operations, infrared electromagnetic energy covering over a wide range of wavelengths needs to be reflected. Such operations may not be achieved with spherical voids that are arrayed at regular lattice spacing, as such configuration only selectively reflects profoundly at a discrete set of wavelengths determined by a lattice constant in accordance with the Bragg's law. But when spherical voids are randomly distributed, infrared electromagnetic reflections, albeit less profound in magnitude, occur over a wide range of wavelengths, which is a preferred characteristic of successful heat blocking operations.

In the multi-layered coating system of the present invention including the first embodiment 100, each sub-coating layer includes a plurality of spherical voids that are arranged to be separated from one another. When a plurality of spherical voids are arranged to be separated from one another, it means that the plurality of spherical voids do not contact one another. It is preferable that the plurality of spherical voids in each sub-coating layer are sufficiently separated from one another so that interactions between two nearest neighboring spherical voids may be neglected.

Figure 3:
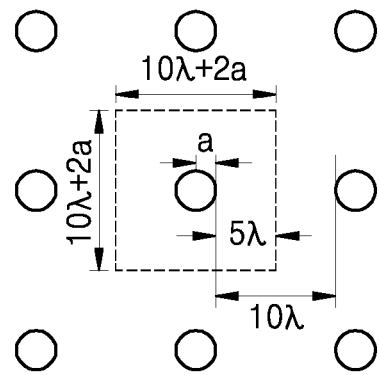
FIG. 3 is a view of a square lattice for calculating a distance between spherical voids of a multi-layered coating system according to the present invention.

FIG. 3 illustrates a case where a nearest surface to surface separation between nearest neighboring spherical voids in a two-dimensional (2D) lattice in each sub-coating layer is $10\lambda$ (=$10\lambda_o/n$). $\lambda$ is a wavelength of an electromagnetic wave in a filler material in which spherical voids are arranged, $\lambda_o$ is a wavelength of an electromagnetic wave in a free space, $\lambda_o = n\lambda$, and n is a refractive index of the filler material in which the spherical voids are arranged. The number and a weight of spherical voids per unit volume of each sub-coating layer are calculated based on the above. An effective area $A_{\mathit{eff}}$ occupied by one spherical void with a radius a is given by $A_{\mathit{eff}}=(10\lambda+2a)^2$. In a three dimensional (3D) cubic lattice, assuming a nearest surface to surface separation between nearest neighboring spherical voids is $10\lambda$, an effective volume $V_{\mathit{eff}}$ occupied by one spherical void with a radius a may be expressed as $V_{\mathit{eff}}=(10\lambda+2a)^3$. Now, if $V_{\mathit{layer}}$ denotes a volume in one of the first through fourth sub-coating layers 101, 102, 103, and 104 in the first embodiment 100, then the total number $N_p$ of spherical voids in that sub-coating layer is given by $N_p = V_{\mathit{layer}}/V_{\mathit{eff}}$ or $N_p = V_{\mathit{layer}}/(10\lambda+2a)^3 = 1/(10\lambda_o/n+2a)^3$, and the number ($N_p/V_{\mathit{layer}}$) of spherical voids per unit volume of the sub-coating layer is given by $N_p/V_{\mathit{layer}} = 1 (10\lambda+2a)^3 = 1/(10\lambda_o/n+2a)^3$. Furthermore, the total weight $W_p$ of spherical voids (i.e., the weight of total spherical voids in the sub-coating layer) is given by $W_p = N_p mg$ or $W_p = 4.1888 \rho a^3 g V_{\mathit{layer}}/(10\lambda+2a)^3 = 4.1888 \rho a^3 g V_{\mathit{layer}}/(10\lambda_o/n+2a)^3$, and the weight ($W_p/V_{\mathit{layer}}$) of spherical voids per unit volume of the sub-coating layer is given by $W_p/V_{\mathit{layer}} = 4.1888 \rho a^3 g/(10\lambda_o+2a)^3 = 4.1888 \rho a^3 g/(10\lambda_o/n+2a)^3$, where g is a gravity constant, $\rho$ is an effective mass density of a void, and m is a total effective mass of a single spherical void defined by $m=\rho(4/3)\pi a^3$ or $m=4.1888 \rho a^3$. An ideal void is empty, and thus has no mass. However, a physical void may be realized by using a structure such as a hollow shell. In this case, when a thickness of the hollow shell is very small, a radius of the void may be a, and an effective mass density p of the void may be calculated by dividing a volume V of the hollow shell by a total effective mass m of the hollow shell. That is, the effective mass density p of the physical void is m/V. The nearest surface to surface separation of $10\lambda$ in FIG. 3 is only an approximation to a separation at which interactions between spherical voids may be neglected. Therefore, any separation which is larger than $10\lambda$ also becomes a valid analysis here. In that regard, $N_p$ and $W_p$ may be re-expressed as $N_p \leq V_{\mathit{layer}}/(10\lambda_o/n+2a)^3$ and $W_p \leq 4.1888 \rho a^3 g V_{\mathit{layer}}/(10\lambda_o/n+2a)^3$, and ($N_p/V_{\mathit{layer}}$) and ($W_p/V_{\mathit{layer}}$) may be re-expressed as ($N_p/V_{\mathit{layer}}$)$\leq 1/(10\lambda_o/n+2a)^3$ and ($W_p/V_{\mathit{layer}}$)$\leq 4.1888 \rho a^3 g/(10\lambda_o/n+2a)^3$.

In general, scattering of electromagnetic waves in a mixture involving randomly distributed particulates requires an explicit calculation of a scattering solution from a single particulate configuration. Often such scattering solution is sufficient to explain a scattering phenomenon in such mixtures. For example, light transmission and reflection in a jar of milk or a cumulus cloud may be quantitatively explained by the Mie theory problem involving a single milk particle in the jar of milk or a single raindrop in the cumulus cloud. In the foregoing embodiments, cases where randomly distributed voids are embedded in a medium such as a filler material have been considered. From the physics point of view, electromagnetic scattering in such systems involves single particle Mie theory solutions. The details of physics used in this specification may be found in the following reference: C. Bohren and D. Huffman, "Absorption and Scattering of Light by Small Particles," John Wiley & Sons, Inc., 1998; ISBN 0-471-29340-7.

A nearest surface to surface separation between nearest neighboring spherical voids in each sub-coating layer of the multi-layered coating system of the present invention is not limited to $10\lambda$ of FIG. 3. If a different separation, for example, $5\lambda$, between two nearest neighboring spherical voids may be considered as a length at which spherical voids are considered 'sufficiently separated', then $N_p$ and $W_p$ may be simply given by $N_p \leq V_{layer}/(5\lambda_o/n+2a)^3$ and $W_p \leq 4.1888 \rho a^3 g V_{layer}/(5\lambda_o/n+2a)^3$, and $(N_p/V_{layer})$ and $(W_p/V_{layer})$ may be given by $(N_p/V_{layer}) \leq 1/(5\lambda_o/n+2a)^3$ and $(W_p/V_{layer}) \leq 4.1888 \rho a^3 g/(5\lambda_o/n+2a)^3$. A separation at which two voids may be considered sufficiently far away so that any interaction between the two may be neglected mostly depends on a type of the voids. For instance, if the voids are charged then a separation of $10\lambda$ may not be sufficient to neglect interactions between the two voids. Nevertheless, the choice of $10\lambda$ in FIG. 3 makes most type of particulates, 'sufficiently separated'.

In the multi-layered coating system of the present invention including the first embodiment 100, a plurality of voids of each sub-coating layer may be formed to have spherical shapes. A plurality of spherical voids here refer to a plurality of voids having substantially spherical shapes on average. Accordingly, when a plurality of voids have substantially spherical shapes on average, some of the plurality of voids may have shapes that deviate from spherical shapes, for example, spheroidal shapes.

In the multi-layered coating system of the present invention including the first embodiment 100, a plurality of spherical voids of each sub-coating layer may be formed of various materials in various ways. For example, the plurality of spherical voids of each sub-coating layer may each be formed of one selected from the group consisting of a hollow dielectric shell, a hollow conductive shell, and a hollow semiconductor shell. In this case, each spherical void may have a cavity radius ranging from 0.002 micron to 500 microns. Also, the spherical void may be a hollow shell that is separately formed from a filler material and is blended in the filler material, or may be a spherical void formed in a filler material itself. Furthermore, the spherical void may be a hollow shell whose inner or outer surface is coated with a material selected from the group consisting of a dielectric material, a conductive material, and a semiconductor material. A list of conductive materials that may be used to form a spherical void that is a hollow conductive shell includes, but not limited to, aluminum, chromium, cobalt, copper, gold, iridium, lithium, molybdenum, nickel, osmium, palladium, platinum, rhodium, silver, tantalum, titanium, tungsten, vanadium, an alloy thereof (for instance, aluminum-copper and steel), and a mixture thereof. Spherical voids may be formed as hollow multi-layered shells. A shell of each layer may be formed of a dielectric material, a conductive material, or a semiconductor material. Although dielectric materials or semiconductor materials having high refractive indices may be selected as materials of spherical voids, it is preferable to select conductive materials as materials of spherical voids.

In the multi-layered coating system of the present invention including the first embodiment 100, a plurality of spherical voids of each sub-coating layer each have a common radius a. Considering that in reality it is very difficult, although not impossible, to manufacture two spherical voids which have same radius a, the radius a here must be understood as the average radius for the spherical voids. Accordingly, from among the plurality of spherical voids having the average radius a, there may be voids with radii which is different from the average radius a. For example, in the first sub-coating layer 101, $a_{11}$ is an average radius of the plurality of first spherical voids 11, $a_{12}$ is an average radius of the plurality of second spherical voids 12, $a_{13}$ is an average radius of the plurality of third spherical voids 13, and $a_{14}$ is an average radius of the plurality of fourth spherical voids 14. Also, spherical voids of each sub-coating layer may have radii different from those of spherical voids of another sub-coating layer. For instance, in the first embodiment 100, spherical voids of the first sub-coating layer 101 include one type of voids with the radius $a_{11}$, spherical voids of the second sub-coating layer 102 include one type of voids with the radius $a_{12}$, spherical voids of the third sub-coating layer 103 include one type of voids with the radius $a_{13}$, and spherical voids of the fourth sub-coating layer 14 include one type of voids with the radius $a_{14}$. Here, the radii $a_{11}$, $a_{12}$, $a_{13}$, and $_{14}$ satisfy $a_{11} < a_{12} < a_{13} < a_{14}$.

In the multi-layered coating system of the preset invention including the first embodiment 100, each sub-coating layer includes a filler material with a refractive index n that is disposed in a space between a plurality of spherical voids. A filler material of each sub-coating layer may have a refractive index that is different from or the same as that of a filler material of another sub-coating layer. Even when filler materials of sub-coating layers are the same, the filler materials may have different refractive indices. Even when filler materials are different, the filler materials may have the same refractive index. In the first embodiment 100, the first sub-coating layer 101 includes a first filler material 51 with a refractive index $n_{51}$, the second sub-coating layer 102 includes a second filler material 52 with a refractive index $n_{52}$, the third sub-coating layer 103 includes a third filler material 53 with a refractive index $n_{53}$, and the fourth sub-coating layer 104 includes a fourth filler material 54 with a refractive index $n_{54}$. Refractive indices of the first through fourth filler materials 51, 52, 53, and 54 are the same. That is, $n_{51} = n_{52} = n_{52} = n_{54}$.

In the multi-layered coating system of the present invention including the first embodiment 100, a filler material included in each sub-coating layer may be selected from the group consisting of dielectric materials, ceramic materials, composite materials (composite mixtures), and polymeric materials. A list of these includes, but not limited to, paint, clay, glue, cement, asphalt, polymeric materials, gelatin, glasses, resins, binders, oxides, and combinations thereof. A list of composite mixtures includes paint, clay, glue, cement, and the like. A list of polymeric materials includes, but not limited to, agarose, cellulose, epoxy, hydrogel, polyacrylamide, polyacrylate, poly-diacetylene, polyepoxide, polyether, polyethylene, polyimidazole, polyimide, polymethylacrylate, polymethylmethacrylate, polypeptide, polyphenylene-vinylene, polyphosphate, polypyrrole, polysaccharide, polystyrene, polysulfone, polythiophene, polyurethane, polyvinyl, and the like. The filler materials 51, 52, 53, and 54 may also be formed from other polymeric materials such as agarose, cellulose, epoxy, hydrogel, silica gel, water glass (or sodium silicate), silica glass, siloxane, and the like. Various resins include synthetic resins such as acrylic and plant resins such as mastics. A list of oxide based on dielectric materials includes, but not limited to, aluminum oxide, beryllium oxide, copper(I) oxide, copper(II) oxide, dysprosium oxide, hafnium(IV) oxide, lutetium oxide, magnesium oxide, scandium oxide, silicon monoxide, silicon dioxide, tantalum pentoxide, tellurium dioxide, titanium dioxide, yttrium oxide, ytterbium oxide, zinc oxide, zirconium dioxide, and the like.

In the multi-layered coating system of the present invention including the first embodiment 100, when the number of spherical voids that are randomly distributed in each sub-coating layer is very large and a diameter of each of the spherical voids is very small, each sub-coating layer has a structure similar to an aerogel structure. An aerogel is a synthetic porous material.

Figure 4:
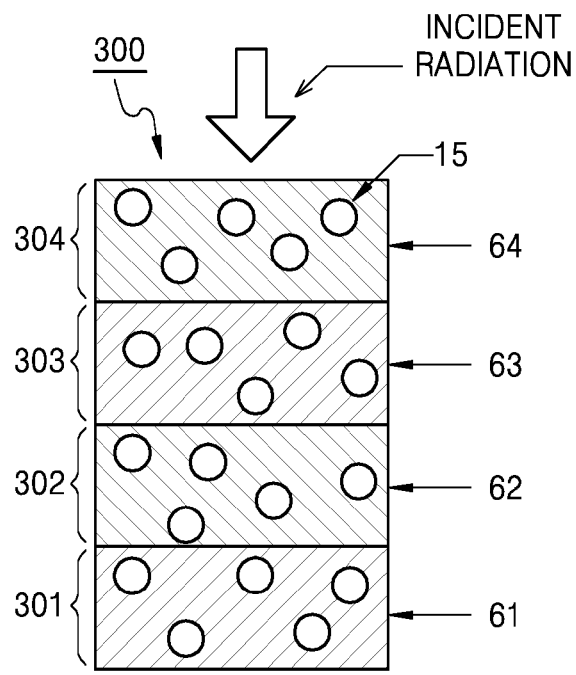
FIG. 4 is a cross-sectional view taken along line AB of the multi-layered coating system of FIG. 1 according to another embodiment of the present invention.

FIG. 4 is a cross-sectional view taken along line AB of the multi-layered coating system 900 of FIG. 1 according to a second embodiment 300. In the multi-layered coating system of the present invention including the second embodiment 300, although a size distribution of spherical voids in each sub-coating layer may be the same as that of spherical voids of another sub-coating layer, a refractive index of a filler material of each sub-coating layer may be different from that of a filler material of another sub-coating layer. In such multilayered coating system, although the spherical voids of all sub-coating layers share a common (i.e., same) size distribution, the filler materials of each sub-coating layers have different refractive indices; and, therefore each sub-coating layers actually possess different characteristics.

In the second embodiment 300, the first spherical voids 15 of one radius are randomly distributed across the first through fourth sub-coating layers 301, 302, 303, and 304 with the refractive indices of the first through fourth sub-coating layers 301, 302, 303, and 304 satisfying $n_{61} < n_{62} < n_{63} < n_{64}$, where $n_{61}$, $n_{62}$, $n_{63}$, and $n_{64}$ respectively denote refractive indices of the filler materials 61, 62, 63, and 64.

The multi-layered coating system based on the second embodiment 300 suffers from internal reflections which occur at the interfaces of sub-coating layers due to different refractive indices of the sub-coating layers. Such internal reflections inevitably contribute to the self-heating of the multi-layered coating system.

Figure 5:
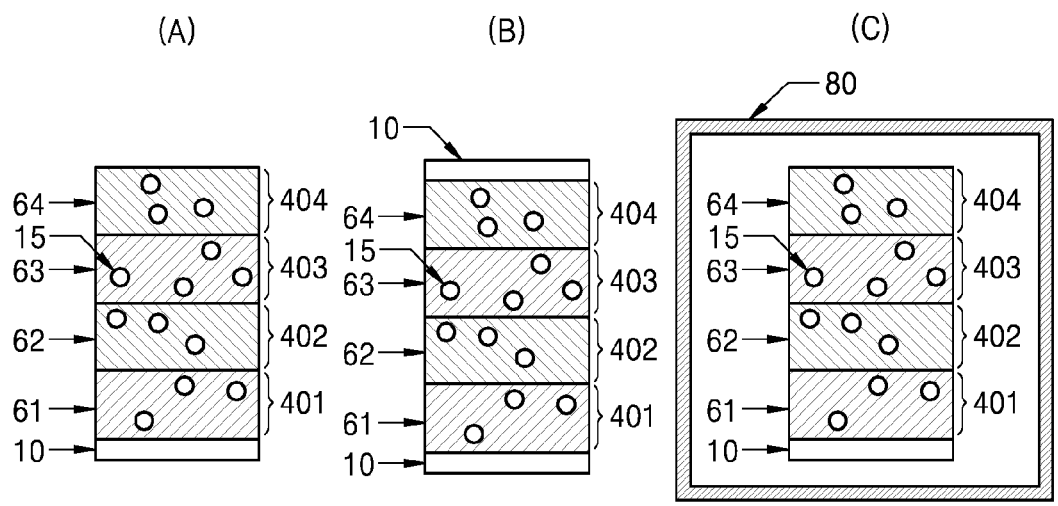
FIG. 5 is a view of a multi-layered coating system including a substrate or a sealing member according to other embodiments of the present invention.

The multi-layered coating system of the present invention may further include a substrate or a sealing member. The substrate may be disposed at any of various positions, for example, below the lowermost sub-coating layer or above the uppermost sub-coating layer. The sealing member may be used to envelope the multi-layered coating system such that the multi-layered coating system is sealed from the outside. In a third embodiment of FIG. 5A, a substrate 10 is disposed below a first sub-coating layer 401. Although not explicitly shown in FIG. 5, the substrate 10 may be also disposed above a layer (e.g., a fourth sub-coating layer 404) that is the farthest from the first sub-coating layer 401. In a fourth embodiment of FIG. 5B, the substrate 10 is disposed below the first sub-coating layer 401 and above the fourth sub-coating layer 404. In a fifth embodiment of FIG. 5C, the multi-layered coating system including the substrate 10 is enveloped with a sealing member 80. The sealing member 80 surrounds the multi-layered coating system to seal the multi-layered coating system from the outside. Also, the air inside of the sealing member 80 may be emptied such that the sealing member 80 is kept in a vacuum state with no air. In the third through fifth embodiments, the first through fourth sub-coating layers 401, 402, 403, and 404 respectively include the first through fourth filler materials 61, 62, 63, and 64. The spherical voids 15 having one size are randomly distributed across the first through fourth filler materials 61, 62, 63, and 64 to be separated from one another.

The multi-layered coating system of the present invention including the first and second embodiments 100 and 300 may be directly applied to any surfaces. Examples of the surfaces include surfaces of houses, home appliances, windows, vehicles, fabrics, clothes, paper sheets, electronic products, and ceramic products. Accordingly, if FIG. 5A of the third embodiment is a cross-sectional view of a paint as a multi-layered coating system applied to a wall, the substrate 10 corresponds to the wall. If FIG. 5B of the fourth embodiment is a cross-sectional view of a coating system that is applied to a fabric, the substrate 10 corresponds to the fabric. If FIG. 5A of the third embodiment is a cross-sectional view of a coating system applied to a windowpane, the substrate 10 corresponds to the glass.

Materials for the substrate 10 may be selected from the group consisting of conductive materials, dielectric materials, ceramic materials, composite materials, semiconductor materials, polymeric materials, and fabrics. Here, ceramic materials, composite materials, polymeric materials, and fabrics have been listed as if they were materials different from conductive materials, dielectric materials, or semiconductor materials. To clarify any possible misconceptions, all materials may be categorized into the following three: conductive materials, dielectric materials, and semiconductor materials. Now, depending on actual components of a material, each of ceramic materials, composite materials, polymeric materials, and fabrics may be categorized into conductive materials, dielectric materials, or semiconductor materials. That said, whenever, for example, the term "dielectric material" or "dielectric" is mentioned in the specification, it shall be understood that the term includes all materials that are dielectrics, including any ceramic materials, composite materials, polymeric materials, or fabrics that are categorized as dielectric materials. Similarly, whenever the term "conductive material" or "conductor" is mentioned in the specification, it shall be understood that the term includes all materials that are conductors, including any ceramic materials, composite materials, polymeric materials, or fabrics that are categorized as conductive materials. And, whenever the term "semiconductor material" or "semiconductor" is mentioned in the specification, it shall be understood that the term includes all materials that are semiconductors, including any ceramic materials, composite materials, polymeric materials, or fabrics that are categorized as semiconductor materials.

A list of conductive materials that may be used to form the substrate 10 includes, but not limited to, aluminum, chromium, cobalt, copper, gold, iridium, lithium, molybdenum, nickel, osmium, palladium, platinum, rhodium, silver, tantalum, titanium, tungsten, vanadium, an alloy thereof (for instance, aluminum-copper and steel), and a mixture thereof. A list of composite materials that may be used to form the substrate 10 includes, but not limited to, concrete, asphalt-concrete, fibre-reinforced polymers, carbon-fibre reinforced plastics, glass-reinforced plastics, reinforced rubber, laminated woods, plywood, paper, fiber glasses, a brick, and various composite glasses. A list of polymeric materials that may be used to form the substrate 10 includes, but not limited to, polyacrylamide, polyacrylate, poly-diacetylene, polyepoxide, polyether, polyethylene, polyimidazole, polyimide, polymethylacrylate, polymethylmethacrylate, polypeptide, polyphenylene-vinylene, polyphosphate, polypyrrole, polysaccharide, polystyrene, polysulfone, polythiophene, polyurethane, polyvinyl, and the like. The substrate 10 may also be formed from other polymeric materials such as agarose, cellulose, epoxy, hydrogel, silica gel, silica glass, siloxane, and the like. A list of fabrics that may be used to form the substrate 10 includes animal textiles, plant textiles, mineral textiles, synthetic textiles, and combinations thereof.

The multi-layered coating system of the present invention may further include a plurality of holes that are randomly distributed in a filler material of a sub-coating layer to be separated from one another. The plurality of holes included in the filler material may be formed in all or some of sub-coating layers that constitute the multi-layered coating system. The plurality of holes may be smaller or larger than a plurality of spherical voids of each sub-coating layer.

Furthermore, the plurality of holes may be spherical holes like the plurality of spherical voids, or amorphous holes. The plurality of holes formed in the filler material improve the scattering efficiency of radiation incident on the multi-layered coating system or improve a thermal conductivity reduction rate (i.e., reduce thermal conductivity).

Figure 6:
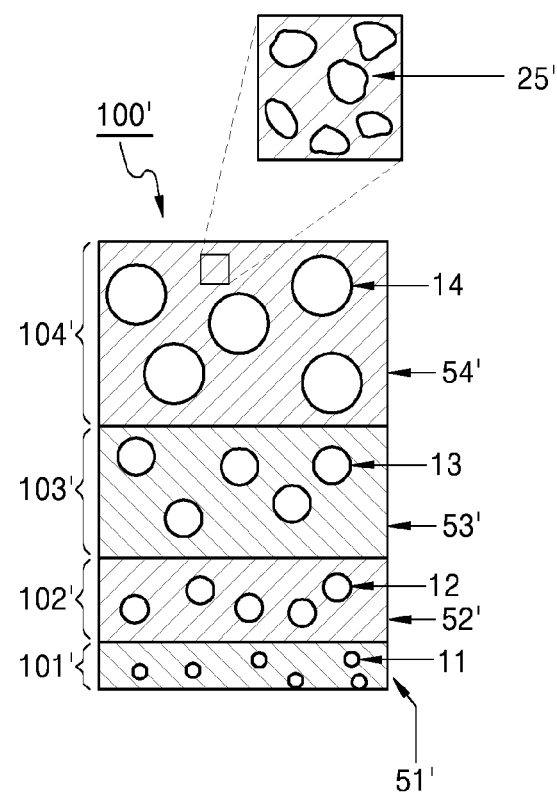
FIG. 6 is a view of a multi-layered coating system including a filler material having a plurality of holes according to another embodiment.

In a sixth embodiment 100' of FIG. 6, which is a modification of the first embodiment 100, a plurality of holes 25' are formed in first through fourth filler materials 51', 52', 53', and 54' respectively included in first through fourth sub-coating layers 101', 102', 103', and 104'. The plurality of holes 25' are formed to be smaller than the first through fourth spherical voids 11, 12, 13, and 14 The plurality of holes 25' may be bubbles that are chemically or naturally produced when the first through fourth filler materials 51', 52', 53', and 54' are formed. For example, when the first through fourth filler materials 51', 52', 53', and 54' are formed of polyurethane foam, bubbles are chemically produced.

Figure 7:
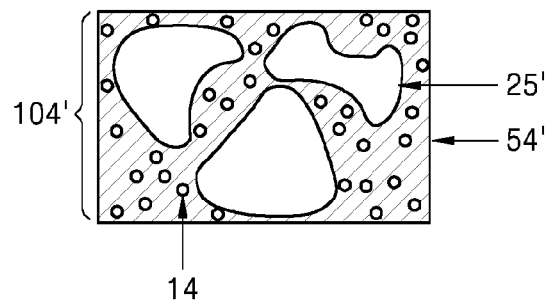
FIG. 7 is a view illustrating a modification of the holes formed in the filler material of FIG. 6.

FIG. 7 illustrates a modification of the holes 25' in the fourth filler material 54' included in the fourth sub-coating layer 104' of the sixth embodiment 100'. In FIG. 7, the plurality of holes 25' in the filler material are larger than the fourth spherical voids 14. In this case, the filler material has a form which resembles a Swiss cheese.

Figure 8:
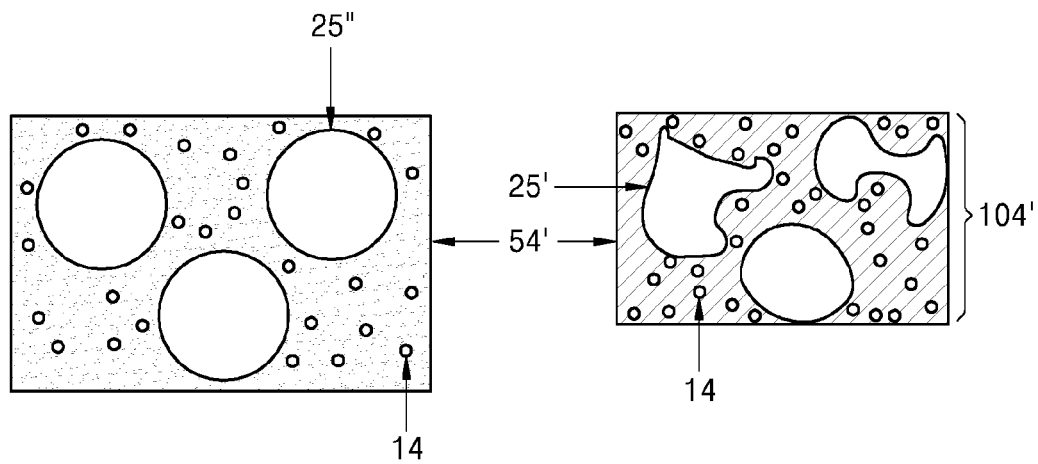
FIG. 8 is a view illustrating another modification of the holes formed in the filler material of FIG. 6.

FIG. 8 illustrates another modification of the plurality of holes 25' in the fourth filler material 54' included in the fourth sub-coating layer 104' of the sixth embodiment 100'. In FIG. 8, a plurality of holes 25" in the fourth filler material 54' have spherical shapes with a radius b and are larger than the fourth spherical voids 14. The plurality of large spherical holes 25" may be formed by, for example, embedding large hollow spherical shells in a filler material or forming large spherical voids in a filler material itself.

Figure 9:
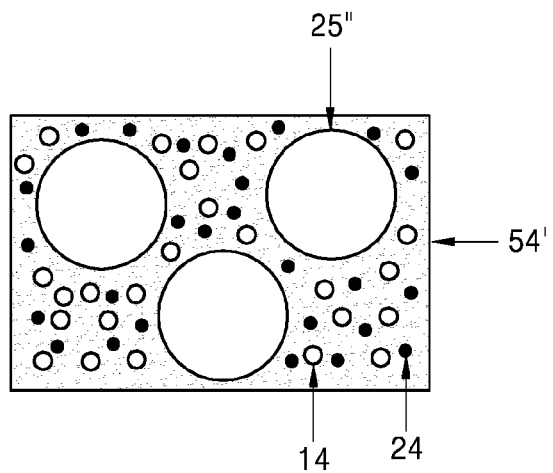
FIG. 9 is a view illustrating another modification in which a plurality of spherical particles are further included in the filler material of FIG. 6.
Figure 10:
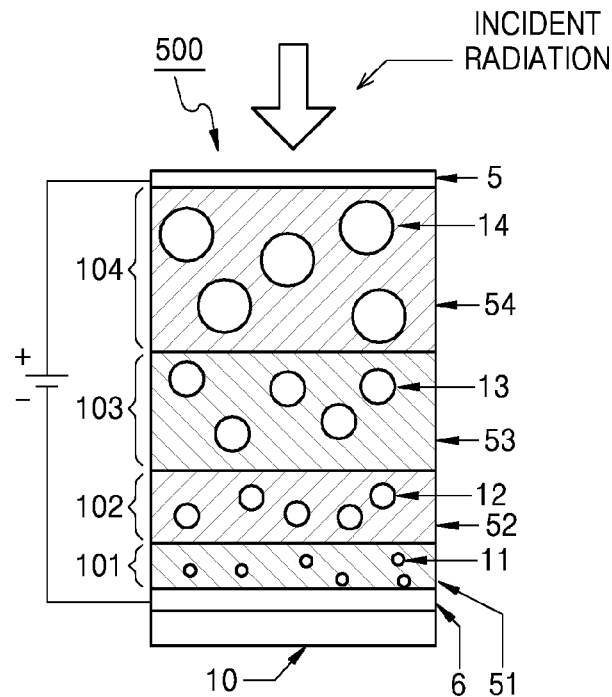
FIG. 10 is a view of a multi-layered coating system including an electrode as an electromagnetic wavelength filter according to another embodiment of the present invention.

FIG. 9 illustrates another modification of the plurality of holes 25' in the fourth filler material 54' included in the fourth sub-coating layer 104' of the sixth embodiment 100'. In FIG. 9, the plurality of holes 25" with the radius b that are larger than the plurality of fourth spherical voids 14 with the radius $a_{14}$ are formed in the fourth filler material 54' and a plurality of fourth spherical particles 24 with a radius $c_{24}$ that are randomly distributed in the fourth filler material 54' to be separated from one another are additionally formed. The radius $c_{24}$ of the fourth spherical particles 24 is less than the radius $a_{14}$ of the fourth spherical voids 14 and the radius b of the spherical holes. That is, the radius $c_{24}$, the radius $a_{14}$, and the radius b satisfy $b>a_{14}>c_{24}$. Although not explicitly shown in FIG. 9, as another modification of the plurality of holes 25' respectively formed in the first through third filler materials 51', 52', and 53' respectively included in the first through third sub-coating layers 101', 102', and 103' of the sixth embodiment 100', the plurality of holes 25" with the radius b that are larger than the plurality of first spherical voids 11 with the radius $a_{11}$ and a plurality of first spherical particles 21 with a radius $c_{21}$ are randomly distributed in the first filler material 51' to be separated from one another, the plurality of holes 25" with the radius b that are larger than the plurality of second spherical voids 12 with the radius $a_{12}$ and second spherical particles 22 with a radius $c_{22}$ are randomly distributed in the second filler material 52' to be separated from one another, and the plurality of holes 25" with the radius b that are larger than the plurality of third spherical voids 13 with the radius $a_{13}$ and a plurality of third spherical particles 23 with a radius $c_{23}$ are randomly distributed in the third filler material 53' to be separated from one another. Radii of the first through third spherical particles 21, 22, and 23 each satisfy $b>a_{11}>c_{21}$, $b>a_{12}>c_{22}$, and $b>a_{13}>c_{23}$, like the radius of the fourth spherical particles 24. Also, the radii of the first through fourth spherical particles 21, 22, 23, and 24 satisfy $c_{21}<c_{22}<c_{23}<c_{24}$. Although the plurality of holes 25' in the first through fourth filler materials 51', 52', 53', and 54' in the sixth embodiment 100' have spherical shapes, the present invention is not limited thereto. For example, the plurality of holes 25' in the first through fourth filler materials 51', 52', 53', and 54' may have amorphous shapes, instead of spherical shapes. FIG. 10 is a view of electrodes constituting an activated electromagnetic wavelength filter according to a seventh embodiment 500 that is a modification of the first embodiment 100. A beginning edge of a reflecting region may be shifted by an applied electric field. In the seventh embodiment 500, a first electrode 5 is adjacent to one of two surfaces of the fourth sub-coating layer 104 that is the farthest from the first sub-coating layer 101 and a second electrode 6 is located between the first sub-coating layer 101 and the substrate 10. A first voltage is applied to the first electrode 5 and a second voltage is applied to the second electrode 6. The first electrode 5 or the second electrode 6 may not be limited to a position on one of the two surfaces of the fourth sub-coating layer 104 that is the farthest from the first sub-coating layer 101 or a position between the first sub-coating layer 101 and the substrate 10, and may be located at any of various positions, if necessary. An electric field between the first and second electrodes 5 and 6 is formed by applying bias voltages to the first and second electrodes 5 and 6. Semiconductor materials behave like dielectric materials in the absence of an electric field. But when exposed to an electric field, semiconductor materials behave like conductive materials. Such property may be used to effectively control a wavelength at which an electromagnetic wave starts to be reflected. For example, a value of $\lambda_4$ in a portion '504' of FIG. 11 may be shifted by controlling the strength of an electric field to which a sub-coating layer corresponding to the portion 504 is exposed.

The first and second electrodes 5 and 6 of the seventh embodiment 500 may be formed of plane conductors which are transparent to wavelengths of interest. For instance, in the case of infrared reflectors, the first electrode 5 has to be transparent to infrared electromagnetic waves of interest. Moreover, if the multi-layered coating system illustrated in the seventh embodiment 500 is optically transparent, then both the first and second electrodes 5 and 6 must be optically transparent as well as transmitting infrared waves of interest.

In general, the first and second electrodes 5 or 6 or both may be patterned with grid or grating structures, or with more complicated patterns such as an array of holes or squares, etc. When electrodes are patterned with such structures, infrared wavelengths of interest and visible light may be transmitted through openings in the patterned electrodes. When electrodes are patterned with openings, conductive materials for the electrodes are not limited only to optically transparent conductors that transmit infrared wavelengths of interest, but any conductive materials may be used.

Operations of the multi-layered coating system according to the one or more embodiments will now be explained in detail.

Figure 11:
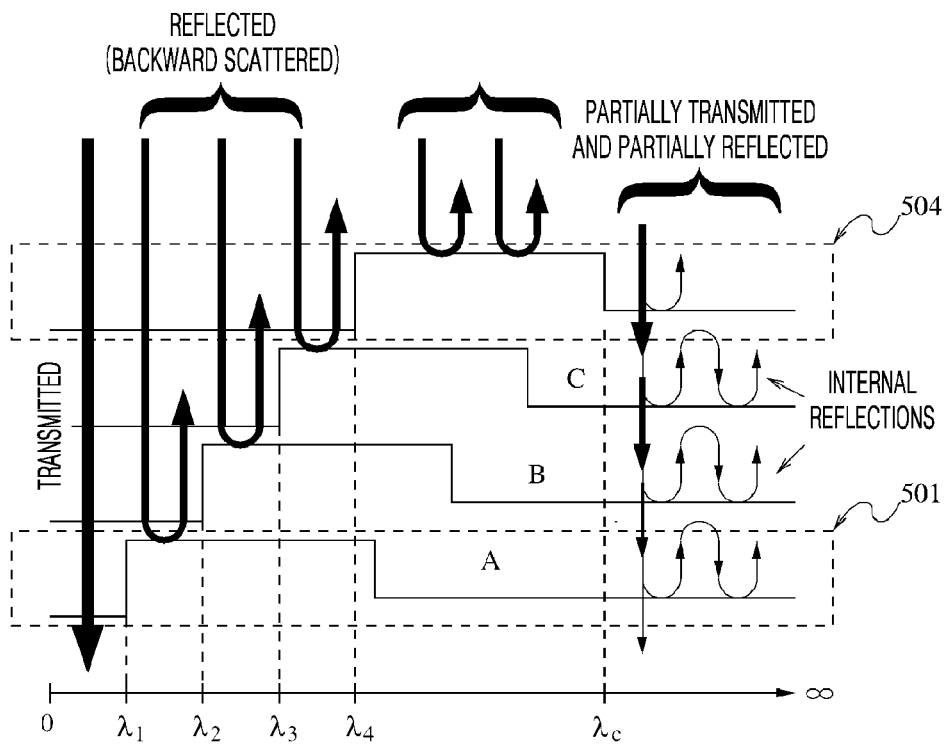
FIG. 11 is a view for explaining an operation of selectively blocking (or reflecting) electromagnetic radiation and transmitting the remainder in a particular range of wavelengths.

FIG. 11 is a schematic view for explaining transmission and reflection operations in an ideal multi-layered coating system 100, as opposed to a physical (realistic) multi-layered coating system 100. Although the transmission and reflection operations illustrated in FIG. 11 may be too ideal for a physical multi-layered coating system, the illustration provides a concise description of how wavelengths are selectively filtered in a multi-layered coating system. It shall be shown later that a physical multi-layered coating system also exhibits equivalent characteristics portrayed in FIG. 11. That in mind, transmission and reflection operations in an ideal multi-layered coating system will now be explained.

An ideal multi-layered coating system includes ideal sub-coating layers. Thus, the ideal multi-layered coating system 100 includes ideal first through fourth sub-coating layers 101, 102, 103, and 104. The transmission and reflection operations in the ideal multi-layered coating system 100 are depicted in FIG. 11, where a portion '501' is for describing the transmission and reflection operations associated with the ideal first sub-coating layer 101 and the portion '504' is for describing similar operations for the ideal fourth sub-coating layer 104. The remaining two operation schemes, which have not been explicitly labeled in FIG. 11, may be readily associated with the ideal second and third sub-coating layers 102 and 103.

In the ideal fourth sub-coating layer 104, an incident electromagnetic wave with a wavelength $\lambda$ is fully transmitted when $\lambda<\lambda_4$, fully reflected when $\lambda_4 \leq \lambda \leq \lambda_c$, and is partially transmitted and partially reflected when $\lambda>\lambda_c$. Sub-coating layers with such wavelength filtering characteristics have useful applications in windowpanes, where it is highly desired to reflect heat or infrared electromagnetic waves while transmitting electromagnetic waves from a visible spectrum and wavelengths used by broadcasting and communication industries.

A width of a reflecting region in the sub-coating layer is finite. For the ideal fourth sub-coating layer 104, a width of a reflecting region is given by $\Delta\lambda=\lambda_c-\lambda_4$. In general, a physical sub-coating layer has a very narrow width $\Delta\lambda$ for a reflecting region. For that reason, a single sub-coating layer, often in heat blocking applications, is not sufficient to block all of unwanted wavelengths in an infrared spectrum. Fortunately, a reflecting region in a sub-coating layer may be shifted in a wavelength range by controlling the diameters of spherical voids included in the sub-coating layer. To illustrate this, consider the portion '501' of FIG. 11 which describes the transmission and reflection operations in the ideal first sub-coating layer 101. A result of the portion 501 may be compared with a result of the portion 504 which describes the transmission and reflection operations in the ideal fourth sub-coating layer 104 which contains spherical voids with larger diameters. Comparing the two results, it may be noticed that a beginning edge of a reflecting region in the portion 501 occurs at $\lambda=\lambda_1$, where $\lambda_4>\lambda_1$. Such a shift in the beginning edge of the reflecting region in the portion 501 is attributed to the smaller spherical voids 11 which are randomly distributed in the first sub-coating layer 101. In the first embodiment 100, radii of the first through fourth spherical voids 11, 12, 13, and 14 of the first through fourth sub-coating layers 101, 102, 103, and 104 satisfy $a_{11}<a_{12}<a_{13}<a_{14}$ and such arrangements of spherical voids in the ideal multi-layered coating system 100 reflect the transmission and reflection operations shown in FIG. 11.

A single sub-coating layer may not be sufficient to reflect all of unwanted wavelengths due to its finite width $\Delta\lambda$ for a reflecting region. However, the first through fourth sub-coating layers 101, 102, 103, and 104 may be stacked together to form a multi-layered coating system with a larger effective width $(\Delta\lambda)_{eff}$ for a reflecting region. For instance, the ideal multi-layered coating system 100 with transmission and reflection operations of FIG. 11 has an effective width $(\Delta\lambda)_{eff}(=\lambda_c-\lambda_1)$ for a reflecting region. In the ideal multi-layered coating system 100, any electromagnetic waves of unwanted wavelengths that have not been reflected by the fourth sub-coating layer 104 eventually are reflected by the subsequent first through third sub-coating layers 101, 102, and 103. Reflected waves belonging to a wavelength range $\lambda_1 \leq \lambda \leq \lambda_4$ in FIG. 11 are free from being trapped in the multi-layered coating system 100 because there are no reflecting regions in a path of travel for these electromagnetic waves. For example, it is assumed that an electromagnetic wave in a wavelength range $\lambda_1 \leq \lambda \leq \lambda_2$ is reflected by the first sub-coating layer 101. Such reflected electromagnetic wave would travel across the second through fourth sub-coating layers 102, 103, and 104 with no internal reflections, finally escaping the multi-layered coating system 100. There are no internal reflections because there are no reflecting regions in its path of travel. Also, for that reason, any reflected electromagnetic waves belonging to the wavelength range $\lambda_1 \leq \lambda \leq \lambda_2$ do not contribute to the self-heating of the multi-layered coating system. However, electromagnetic waves in a wavelength range $\lambda>\lambda_c$ are partially transmitted and partially reflected as they travel across the subsequent sub-coating layers. Such electromagnetic waves are subject to internal reflections at interfaces between the sub-coating layers. As a consequence, these electromagnetic waves contribute to the self-heating of the multi-layered coating system 100. Fortunately, electromagnetic waves in the wavelength range $\lambda>\lambda_c$ are not as energetic as those in the wavelength range $\lambda \leq \lambda_4$. These electromagnetic waves in the wavelength range $\lambda>\lambda_c$ contribute negligibly in the heating of the multi-layered coating system.

In the foregoing description, radiation is irradiated to the top of the multi-layered coating system. In the first embodiment 100, the top is the fourth sub-coating layer 104 and the bottom is the first sub-coating layer 101. Radiation may be irradiated to the bottom of the multi-layered coating system 100 and much of basic transmission and reflection operations of electromagnetic waves would still be described as illustrated in FIG. 11. For instance, incident electromagnetic waves with wavelengths satisfying $0<\lambda<\lambda_1$ are fully transmitted across the sub-coating layers whereas incident electromagnetic waves with wavelengths satisfying $\lambda>\lambda_c$ are partially transmitted and partially reflected. However, major modifications in transmission and reflection operations take place when a direction of incident electromagnetic waves is reversed in FIG. 2. Although incident electromagnetic waves with wavelengths satisfying $\lambda_1 \leq \lambda \leq \lambda_4$ are still fully reflected, incident electromagnetic waves with wavelengths satisfying $\lambda_4<\lambda \leq \lambda_c$ in FIG. 11 are partially reflected and partially transmitted because a direction of incidence is reversed in FIG. 2. Electromagnetic waves that are partially transmitted into regions A, B, and C suffer from internal reflections which occur between different sub-coating layers. Such internal reflections contribute to the self-heating of the multi-layered coating system.

Transmission and reflection operations of a physical multi-layered coating system will now be explained in detail.

A physical first sub-coating layer 104 does not have clear transmitting and reflecting regions as shown in the portion '504', unlike an ideal first sub-coating layer 104. However, when physical sub-coating layers are stacked together to form a multi-layered coating layer, resultant transmission and reflection operations show most of characteristics of an ideal coating system described with reference to FIG. 11.

Figure 12:
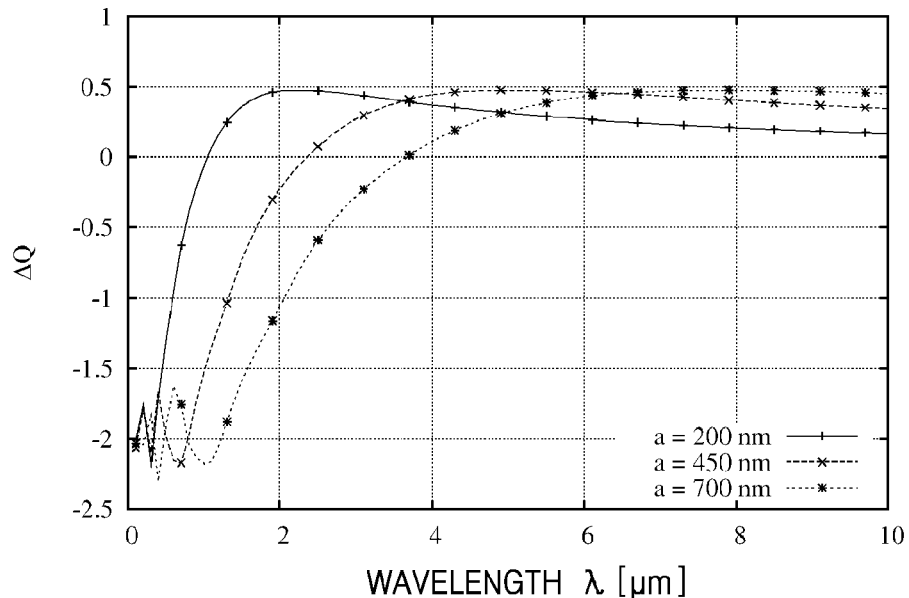
FIG. 12 is a graph showing a relationship between $\Delta Q$ ($=Q_{bac}-Q_{ext}$) and a wavelength, wherein a spherical void embedded in a medium (filler material) with a refractive index n of 1.4962 is irradiated with electromagnetic radiation.

FIG. 12 is a graph of $\Delta Q$ obtained for cases where spherical voids with three different radii (a=200 nm, a=450 nm, and a=700 nm) are embedded in a medium (filler material) with a refractive index n=1.4962 and is irradiated with an electromagnetic wave with an intensity $I_o$. $\Delta Q$ is a difference function of $Q_{bac}-Q_{ext}$, where $Q_{bac}$ is a backward scattering efficiency factor or a back-scattering efficiency factor, and $Q_{ext}$ is an extinction efficiency factor. The Mie theory has been used to calculate $Q_{bac}$ and $Q_{ext}$. Two distinct regions may be readily identified in the graph of $\Delta Q$ in FIG. 12. A first region I is characterized by a negative value for $\Delta Q$ ($\Delta Q<0$) whereas a second region II is characterized by a positive value for $\Delta Q$ ($\Delta Q>0$). Although not clearly shown in FIG. 12, a value of $\Delta Q$ approaches zero for waves with sufficiently large wavelengths. A region in which $\Delta Q$ approaches zero may be identified as a third region III.

Figure 13:
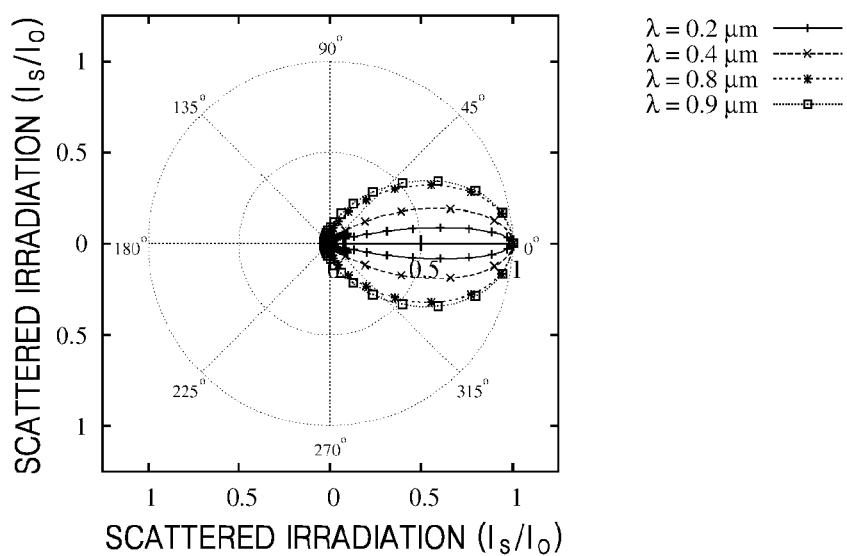
FIG. 13 is a polar graph of scattered radiation corresponding to a case in FIG. 12, wherein a spherical void with a radius a of 200 nm embedded in a medium (filler material) with a refractive index n of 1.4962 is irradiated from the left.
Figure 14:
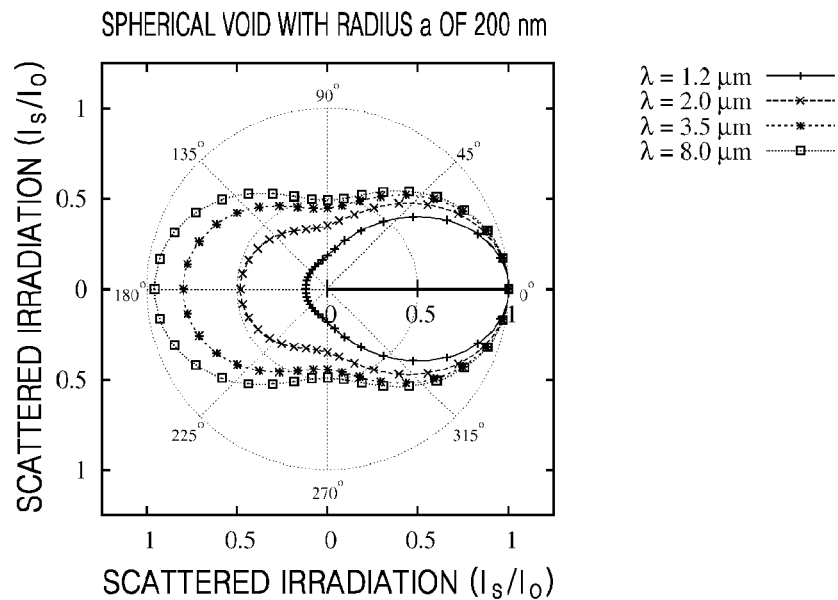
FIG. 14 is a polar graph of scattered radiation corresponding to a case in FIG. 12, wherein a spherical void with a radius a of 200 nm embedded in a medium (filler material) with a refractive index n of 1.4962 is irradiated from the left.

A correspondence between regions of $\Delta Q$ graph in FIG. 12 and regions of transmission and reflection operations in the portion '504' of FIG. 11 is demonstrated for selected wavelengths from the first and second regions I and II. For calculation, it is assumed that a spherical void with a radius a=200 nm, which is embedded in a medium (filler material) with a refractive index n of 1.4962, is irradiated with an electromagnetic wave with an intensity $I_o$. For visual demonstration of forward and backward scattered waves, a ratio of scattered wave intensity $I_s$ and an incident wave intensity $I_o$ has been plotted in a polar graph for each of selected wavelengths from the first and second regions I and II. Results for wavelengths selected from the first region I are shown in FIG. 13 and results for wavelengths selected from the second region II are shown in FIG. 14, where in both polar graphs, a spherical void is located at the center and is irradiated from the left. The results in FIG. 13 and FIG. 14 reveal that waves from the first region I are strongly forward scattered (i.e., transmitted) whereas waves from the second region II are forward scattered (i.e., transmitted) and backward scattered (i.e., reflected). Hence, the first region I in FIG. 12 may be associated with a wavelength range $0<\lambda<\lambda_4$ in the portion '504' and the second region II in FIG. 12 may be associated with a wavelength range $\lambda_4<\lambda<\lambda_c$ in the portion '504'. Although not clearly shown in FIG. 12, a ratio of the scattered wave intensity $I_s$ and the incident wave intensity $I_o$ approaches 1 for wavelengths that are sufficiently large. The waves in this region correspond to waves with wavelengths satisfying $\lambda>\lambda_c$ in the portion '504' of FIG. 10, wherein the waves are partially transmitted and partially reflected at the same ratio. These results reveal that a spherical void embedded in a dielectric medium (filler material) performs in reflecting infrared electromagnetic waves. Also, the presence of spherical voids in a mixture such as a paint improves insulation against heat loss by reducing heat transfers that are associated with a direct thermal conduction process.

Although the sub-coating layers in the foregoing illustrations contained many spherical voids, $\Delta Q$s were explicitly calculated from single spherical void cases and those results were used to describe transmission and reflection operations in the sub-coating layers. Such analysis is valid if spherical voids in each sub-coating layers are sufficiently separated from each other so that interactions between the spherical voids may be neglected. For a given wavelength of interest, for example, $\lambda$, two nearest neighboring spherical particulates that are separated by a distance of ~$10\lambda$ may be considered as "sufficiently separated." For example, in the ideal sub-coating layer 104 whose wave transmission and reflection operations are described by using the portion '504', the 'wavelength of interest, $\lambda$' may be represented by $\lambda=\lambda_4$, which wavelength defines a beginning edge of a reflecting region. Similarly, in the ideal sub-coating layer 101 whose wave transmission and reflection operations are described by using the portion '501', the 'wavelength of interest, $\lambda$' may be represented by $\lambda=\lambda_1$. Now, for physical sub-coating layers (as opposed to ideal sub-coating layers), wave transmission and reflection operations are characterized by the graph of $\Delta Q$.

Various methods for manufacturing a multi-layered coating system will now be explained. Simple processes involved in the fabrication of a multi-layered coating system include (1) preparing mixtures for sub-coating layers and (2) applying the mixtures to a substrate to form the sub-coating layers.

Figure 15:
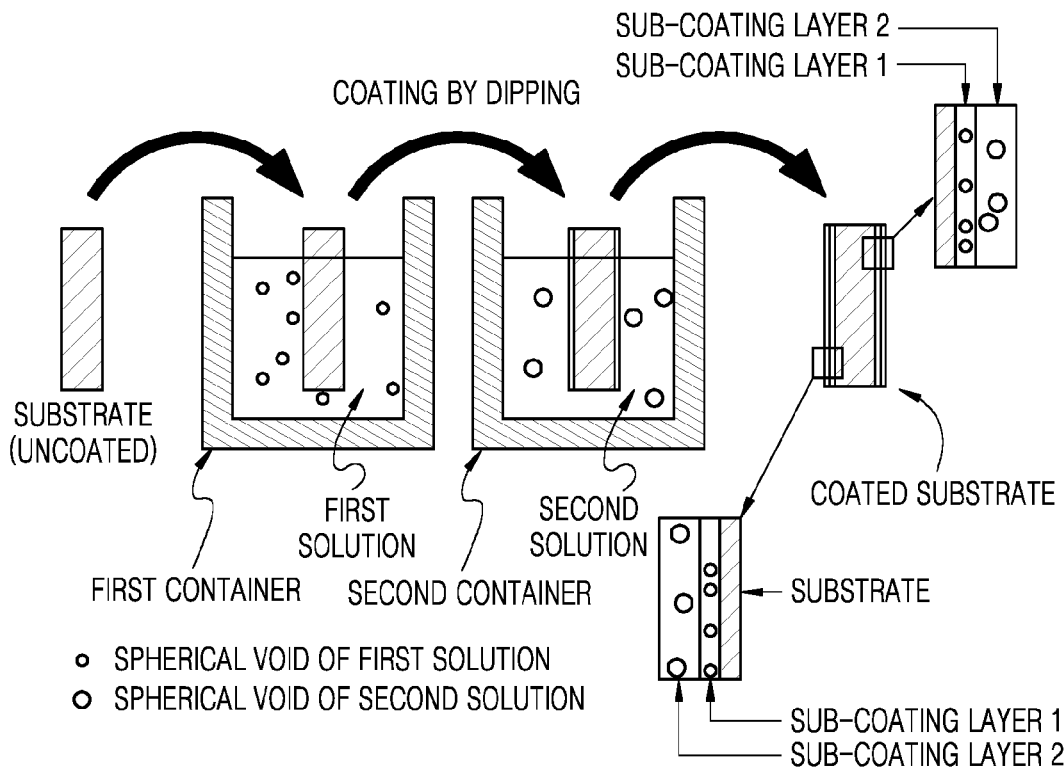
FIGS. 15 through 17 are views for explaining a method of manufacturing a multi-layered coating system according to embodiments of the present invention.

FIG. 15 is a view for explaining a method for manufacturing a multi-layered coating system according to an embodiment. Small spherical voids with one size are blended in a first container having a first solution. Large spherical voids with one size that are larger than the small spherical voids in the first solution are blended in a second container having a second solution. In the case where spherical voids are blended in an ordinary paint, the first solution in the first container and the second solution in the second container may be formed of the ordinary paint. A first sub-coating layer on a substrate may be formed by dipping an uncoated substrate into the first solution of the first container. Next, the substrate coated with the first sub-coating layer may be dried or cured before being dipped into the second solution of the second container. Next, the substrate on which the first sub-coating layer is formed is dipped into the second solution of the second container to coat a second sub-coating layer over the first sub-coating layer. The substrate coated with the second sub-coating layer is dried or cured to manufacture a multi-layered coating system where two sub-coating layers are sequentially formed on the substrate. The multi-layered coating system may be formed on both surfaces of the substrate by using the dipping method.

For substrates on one surface of which, instead of on both surfaces of which, a multi-layered coating system is to be formed, a multi-layered coating system may be formed by coating mixtures blended with spherical voids on only one surface of a substrate by repeatedly performing spin coating.

For objects having cylindrical inner surfaces such as pipes, a multi-layered coating system may be formed by coating mixtures blended with spherical voids on cylindrical inner surfaces by repeatedly performing spin casting.

For objects such as surfaces of houses or vehicles, a multi-layered coating system may be formed on a surface by repeatedly performing spraying.

In the method for manufacturing the multi-layered coating system of FIG. 15, although mixtures for each sub-coating layer are formed by blending the first solution and the second solution with an ordinary paint along with spherical voids, the present invention is not limited thereto. The mixtures for each sub-coating layers in the multi-layered coating system may also be prepared by blending spherical voids with any solutions. Examples of the solutions include, but not limited to, solvent base coatings, composite mixtures (such as glue, clay, and the like), polymeric materials (such as polyurethane, elastomers, plastics, gelatin, epoxy, acrylic, polymethylmethacrylate (PMMA), and the like), various resins and binders such as cement. Alternatively, spherical voids with one size may be blended in a liquefied PMMA solution. Even in this case, the second solution in FIG. 15 may also be represented by liquefied PMMA but is blended with spherical voids with larger diameters than those blended in the first solution. The multi-layered coating system may be formed on a substrate according to the afore-described dipping processes.

Alternatively, the mixtures for each sub-coating layer of the multi-layered coating system may be prepared by blending spherical voids in a solution formed of polymeric materials such as polyurethane. In this case, the first solution and the second solution in FIG. 15 may be represented by polyurethane solutions, wherein each solution contains spherical voids with appropriate diameters.

Figure 16:
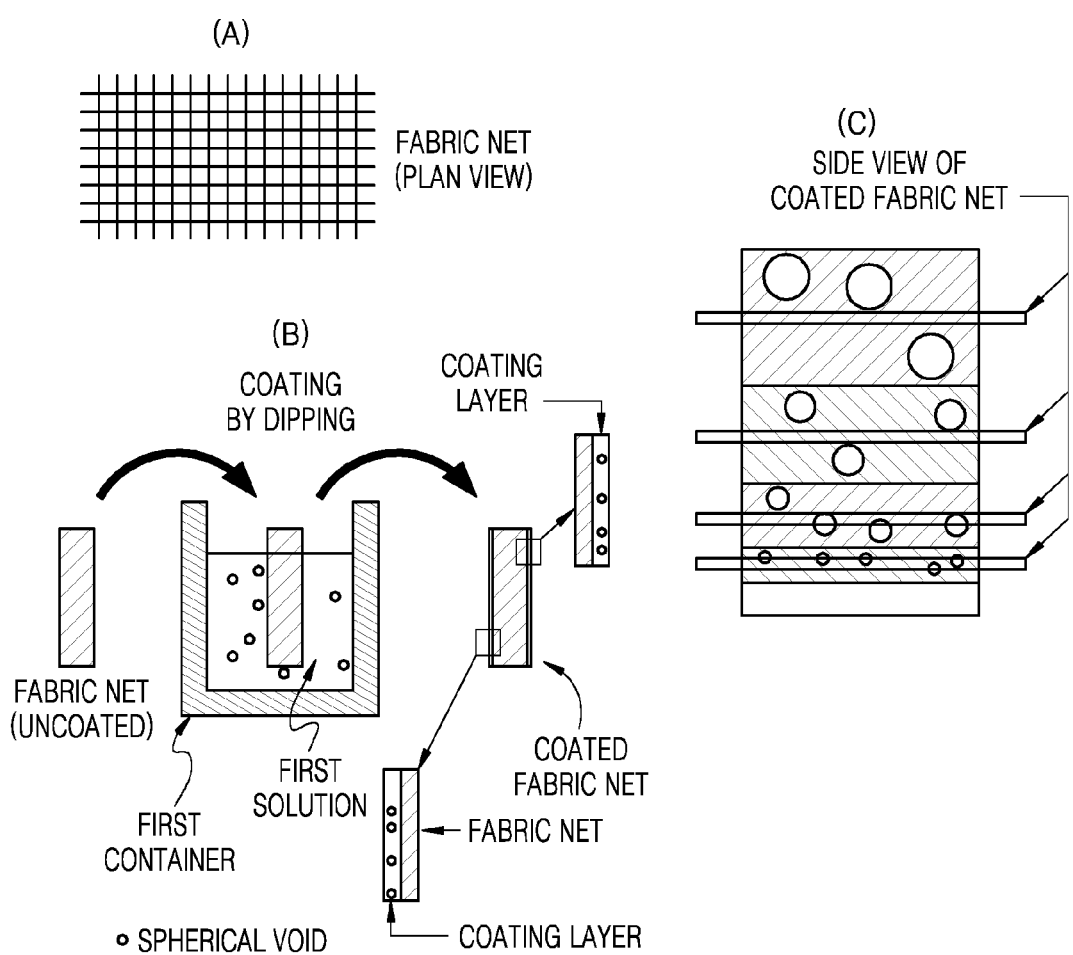

FIG. 16 is a view for explaining a method for manufacturing a multi-layered coating system according to another embodiment. The multi-layered coating system may be formed by soaking (or dipping) a fabric net in the first solution and the second solution according to the afore-described processes. First, the fabric net is prepared as shown in FIG. 16A. The fabric net is a net formed of thread or wire. Next, as shown in FIG. 16B, one sub-coating layer is formed by dipping and coating the fabric net into the first container which contains the first solution blended with spherical voids. In this case, since the fabric net acts as a skeleton, the sub-coating layer is not easily broken or damaged and is structurally flexible. A plurality of sub-coating layers are formed by using this method. A multi-layered coating system may be manufactured by stacking the plurality of sub-coating layers. In this case, in order to couple the plurality of stacked sub-coating layers, the sub-coating layers may be coupled to one another by using a material such as an adhesive or by sewing. An example of the completed multi-layered coating system is illustrated in FIG. 16C.

Similarly, a multi-layered coating system may be formed on a strand of a fabric fiber. That is, the multi-layered coating system may be formed by soaking (or dipping) a strand of a fabric fiber into the first solution and the second solution according to the afore-described processes. Such threads formed of strands of fabric fibers coated with the multi-layered coating system may be used to make heat resistant clothes. Such multi-layered coating system may be used as a heat insulating material for shoes.

Figure 17:
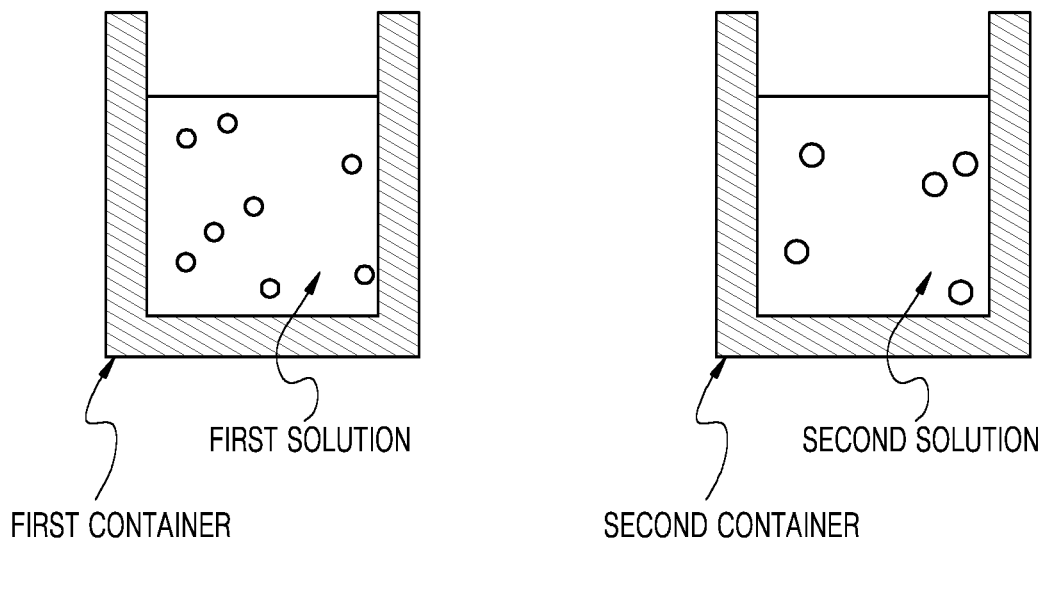

FIG. 17 is a view for explaining a method for manufacturing a multi-layered coating system according to another embodiment. The first solution is prepared in the first container. The first solution refers to a material in which a solution and small voids are blended with each other. Each sub-coating layer of the multi-layered coating system may be formed by pouring the first solution into a mold and curing the first solution. For example, a first sub-coating layer may be formed by pouring the first solution in the first container into a mold and drying the first solution. A second sub-coating layer may be formed by pouring the second solution in the second container into another mold and drying the second solution. The multi-layered coating system may be formed by attaching the first sub-coating layer and the second sub-coating layer by using an adhesive. Instead of attaching the first sub-coating layer and the second sub-coating layer by using the adhesive, the first sub-coating layer and the second sub-coating layer may be sewed.

The first and second solutions of FIG. 17 may be formed by using any of various blending methods. For example, the first and second solutions may be formed by blending spherical voids in aqua polyurethane or water-based polyurethane. Water-based polyurethane has a structure in which polyurethane polymer is emulsified in water, and a solid content of a polyurethane polymer to water varies among different brands. In the case of water-based polyurethane solution with 40% solid content and 60% water by weight, the total mass of the void particles that can be mixed in the polyurethane solution can be more than the twice the mass of the solid content of the polyurethane solution. The viscosity of a mixture increases with the increased mass of void particles. And, therefore, the void particles should be added to the solution up to a point where the viscosity of mixture does not become too large to be workable. On the other hand, when too small amount of void particles are added to a solution, the workability is improved due to low viscosity. However, in such case, the insulation characteristic is also reduced. As an illustration, in the case where the K1 glass bubbles produced by the 3M are used as voids, solid polyurethane polymer of 40 grams of mass may be mixed with a mass of 20 grams of the K1 glass bubbles. In another illustration, where S60HS glass bubbles of the 3M are used, 40 grams of solid polyurethane polymer can be mixed with 88 grams of S60HS glass bubbles. As more glass bubbles are added to a solution, the viscosity of a solution is increased to a state where there is no flow. In order to increase insulation, more glass bubbles need to be added to a solution. However, in this case, it is necessary to consider a viscosity of a solution that ensures workability.

The foregoing is an illustrative of various example embodiments and is not to be interpreted as limiting thereof. Those skilled in the art will notice that many modifications are possible in the example embodiments without departing from the novel teachings and advantages. All such modifications are intended to be included within the scope of present disclosure as defined in the claims.

INDUSTRIAL APPLICABILITY

The present invention may be applied to any field using a heat blocking system and a method for manufacturing the same.

The invention claimed is:
1. A multi-layered coating system, comprising:
   a layer one including a plurality of voids of average radius $a_1$ that are randomly distributed to be separated from one another and a filler material of refractive index $n_1$ that is positioned in spaces between the plurality of voids; and
   subsequent layers having $i\_{max}-1$ layers, $i\_{max}$ being equal to or greater than 2, the subsequent layers comprising a layer $i+1$ positioned above a layer $i$, the layer $i+1$ including a plurality of voids of average radius $a_{i+1}$ that are randomly distributed to be separated from one another and a filler material of refractive index $n_{i+1}$ that is positioned in spaces between the plurality of voids, $i$ being the integers from 1 to $i\_{max}-1$,
   wherein at least two layers among the $i\_{max}$ layers have different values in at least one selected from a group consisting of the average radius of the voids and the refractive index of the filler material so that wavelength bands of electromagnetic waves reflected by the at least two layers are different from each other, and
   wherein, with respect to a specific wavelength of an incident electromagnetic wave to be scattered, the average radius of the voids is determined by utilizing Mie theory so that the difference function which is the value of back-scattering efficiency factor minus extinction efficiency factor is greater than a predetermined positive value, and the incident electromagnetic wave is scattered directly by the voids.
2. The multi-layered coating system of claim 1, further comprising a substrate located below the layer one.
3. The multi-layered coating system of claim 2, wherein the substrate comprises one selected from a group consisting of a conductive material, a dielectric material, a semiconductor material, and a textile.

4. The multi-layered coating system of claim 3, wherein the textile is a fiber having an elongated shape.

5. The multi-layered coating system of claim 1, further comprising a substrate above a layer farthest from the layer one.

6. The multi-layered coating system of claim 5, wherein the substrate comprises one selected from a group consisting of a conductive material, a dielectric material, a semiconductor material, and a textile.

7. The multi-layered coating system of claim 6, wherein the textile is a fiber having an elongated shape.

8. The multi-layered coating system of claim 1, further comprising a sealing member configured to seal the multi-layered coating system from the outside.

9. The multi-layered coating system of claim 8, wherein substantially no air exists in the sealing member.

10. The multi-layered coating system of claim 1, wherein the layer i has a thickness different from a thickness of the layer i−1 where i is an integer greater than 1.

11. The multi-layered coating system of claim 1, wherein the layer i and the layer i−1 have same thickness where i is an integer greater than 1.

12. The multi-layered coating system of claim 1, wherein each layer has a thickness ranging from about 0.01 micron to about 10,000 microns.

13. The multi-layered coating system of claim 1, wherein the filler material comprises one selected from a group consisting of a polymeric material, a binder, a resin, a dielectric material, and a ceramic material.

14. The multi-layered coating system of claim 1, wherein the refractive index of the filler material satisfies $n_i=n_{i-1}$ where i is an integer greater than 1.

15. The multi-layered coating system of claim 1, wherein the refractive index of the filler material satisfies $n_i>n_{i-1}$ where i is an integer greater than 1.

16. The multi-layered coating system of claim 1, wherein the average radius of the voids satisfies $a_i>a_{i-1}$ where i is an integer greater than 1.

17. The multi-layered coating system of claim 1, wherein the average radius of the voids and the refractive index of the filler material satisfy $a_i=a_{i-1}$ and $n_i>n_{i-1}$ where i is an integer greater than 1.

18. The multi-layered coating system of claim 1, further comprising a plurality of voids with an average radius b that are randomly distributed in all of the layers and separated from one another, wherein the average radius b satisfies $b>a_1$ and $b>a_i$ where i is an integer greater than 1.

19. The multi-layered coating system of claim 18, further comprising a plurality of particles with an average radius $c_1$ that are randomly distributed in the filler material of the layer one and separated from one another, and
a plurality of particles with an average radius $c_i$ that are randomly distributed in the filler material of the layer i and separated from one another,
wherein $c_1$ satisfies $b>a_1>c_1$ and $c_i$ satisfies $b>a_i>c_i$ and $c_i>c_{i-1}$ where i is an integer greater than 1.

20. The multi-layered coating system of claim 19, wherein the particles comprise one selected from a group consisting of a conductive material, a dielectric material, a semiconductor material, and a ceramic material.

21. The multi-layered coating system of claim 1, wherein the filler material further comprises a plurality of holes formed in the filler material.

22. The multi-layered coating system of claim 21, wherein the plurality of holes have an average radius larger than the average radius of the voids.

23. The multi-layered coating system of claim 1, wherein the voids have a radius ranging from about 0.002 micron to about 500 microns.

24. The multi-layered coating system of claim 1, wherein the voids are formed of hollow dielectric shells.

25. The multi-layered coating system of claim 1, further comprising:
a first electrode located adjacent to the farther of two surfaces of the layer located farthest from the substrate; and
a second electrode located between the layer one and the substrate,
wherein a first voltage is applied to the first electrode, and a second voltage different from the first voltage is applied to the second electrode.

26. The multi-layered coating system of claim 1, wherein the voids are formed of hollow conductive shells.

27. The multi-layered coating system of claim 1, wherein the voids are formed of hollow semiconductor shells.

28. The multi-layered coating system of claim 1, wherein the voids are formed as hollow multi-layered shells.

29. A method of manufacturing a multi-layered coating system, the method comprising:
(1) preparing a first solution in which a plurality of voids with an average radius $a_1$ are blended with a filler material with a refractive index $n_1$;
(2) processing a substrate with the first solution and forming, on the substrate, a layer one comprising the plurality of voids with the average radius $a_1$ that are randomly distributed and separated from one another, and the filler material with the refractive index $n_1$ that is disposed in a space between the voids;
(3) preparing an ith solution in which a plurality of voids with an average radius $a_i$ is blended with a filler material with a refractive index $n_i$ where i is an integer greater than 1; and
(4) processing the substrate on which a layer i−1 is formed with the ith solution and forming, on the layer i−1 layer, a layer i comprising a plurality of voids with the average radius $a_i$ that are randomly distributed and separated from one another and a filler material with the refractive index $n_i$ that is disposed in a space between the voids where i is an integer greater than 1.

30. The method of claim 29, wherein the processing of (2) is one selected from a group consisting of dipping the substrate into the first solution, spin coating the first solution to the substrate, spin casting the first solution to the substrate, and spraying the first solution to the substrate.

31. The method of claim 29, wherein the processing of (4) is one selected from a group consisting of dipping the substrate on which the layer i−1 is formed into the ith solution, spin coating the ith solution to the substrate on which the layer i−1 is formed, spin casting the ith solution to the substrate on which the layer i−1 is formed, and spraying the ith solution to the substrate on which the layer i−1 is formed where i is an integer greater than 1.

* * * * *